United States Patent [19]

Buckles

[11] Patent Number: 5,542,578
[45] Date of Patent: Aug. 6, 1996

[54] DISPENSING GUN FOR RATIO SENSITIVE TWO-PART MATERIAL

[75] Inventor: Joseph M. Buckles, Portland, Oreg.

[73] Assignee: Viking Industries, Inc., Portland, Oreg.

[21] Appl. No.: 46,398

[22] Filed: Apr. 9, 1993

Related U.S. Application Data

[60] Continuation of Ser. No. 911,973, Jul. 10, 1992, abandoned, which is a division of Ser. No. 572,161, Aug. 23, 1990, Pat. No. 5,133,483.

[51] Int. Cl.$^6$ .................................................. B67D 5/00
[52] U.S. Cl. .................................. 222/145.6; 222/146.5
[58] Field of Search ........................... 222/145, 146.5, 222/145.1, 145.5, 145.6; 239/133, 135, 414

[56] References Cited

U.S. PATENT DOCUMENTS

| | | | |
|---|---|---|---|
| 2,271,767 | 2/1942 | Hummel | 222/134 |
| 2,604,114 | 7/1952 | Rogers et al. | 222/145 X |
| 2,878,063 | 3/1959 | Kish et al. | 239/133 |
| 2,895,644 | 7/1959 | Pande | 222/134 |
| 2,946,488 | 7/1960 | Kraft | 222/309 |
| 3,071,293 | 1/1963 | Lewis-Smith et al. | 222/135 |
| 3,207,378 | 9/1965 | Trumbull et al. | 222/134 |
| 3,221,947 | 12/1965 | Penn | 222/327 |
| 3,224,642 | 12/1965 | Martelaere et al. | 222/134 |
| 3,409,174 | 11/1968 | Radcliffe et al. | 222/70 |
| 3,417,923 | 12/1968 | Carlson | 239/414 X |
| 3,558,051 | 1/1971 | Strickler | 222/145 X |
| 3,606,269 | 9/1971 | Trumbull | 222/134 |
| 3,644,551 | 5/1972 | Ferrari | 222/134 |
| 3,786,990 | 1/1974 | Hagfors | 239/112 |
| 3,814,289 | 6/1974 | Robbins | 222/135 |
| 3,900,163 | 8/1975 | Volker | 239/414 X |
| 3,942,924 | 3/1976 | Schwartz | 222/309 |
| 3,976,248 | 8/1976 | Middleton, Sr. | 239/416.7 |
| 4,002,271 | 1/1977 | Buck | 222/134 |
| 4,019,653 | 4/1977 | Scherer et al. | 222/1 |
| 4,117,551 | 9/1978 | Books et al. | 239/414 X |
| 4,129,231 | 12/1978 | Larson | 222/145 |
| 4,189,070 | 2/1980 | Macosko et al. | 222/134 |
| 4,212,416 | 7/1980 | Bennett | 222/134 |
| 4,458,831 | 7/1984 | Holleran et al. | 239/414 X |
| 4,527,712 | 7/1985 | Cobbs, Jr. et al. | 222/1 |
| 4,643,336 | 2/1987 | Mandeville et al. | 222/145 |
| 4,679,734 | 7/1987 | Mommsen et al. | 239/692 |
| 4,735,509 | 4/1988 | Rausch | 239/333 |
| 4,762,253 | 8/1988 | Palmert | 222/145 |
| 4,795,336 | 1/1989 | Shannon | 222/134 |
| 4,881,820 | 11/1989 | Luckhoff | 222/135 |
| 5,083,878 | 4/1963 | Devine et al. | 222/136 |

FOREIGN PATENT DOCUMENTS

| | | | |
|---|---|---|---|
| 1454898 | 2/1969 | Germany | 222/137 |
| 2338226 | 2/1974 | Germany | 222/134 |

OTHER PUBLICATIONS

*Instructions–Parts List*, Brochure 307–004, Jun. 1975, Graco, Inc., 4 pages.
*Posimixer*, Bulletin No. PM 100, Liquid Control Corp., 2 pages.
Pyles "Little Purge" Mix–Dispense Gun, Form 1–730–004, 3M Jun. 1986, Pyles Division, Sealed Power Corporation, 3 pages.
Binks Models 31 and 31V Flow Guns, Part Sheet 135OR–3, Feb. 1976 Binks Manufacturing Company, 2 pages.
*Stata–tube & Spiral Motionless Mixer*, Data Sheet 35, Mar. 1988, TAH Industries, Inc., 20 pages.
*Motionless Mixers for Adhesives and Sealants*, Catalog 106, TAH Industries, Inc., 4 pages.

*Primary Examiner*—Andres Kashnikow
*Assistant Examiner*—Kenneth Bomberg
*Attorney, Agent, or Firm*—Klarquist, Sparkman, Campbell, Leigh & Whinston

[57] ABSTRACT

A drive linkage (22) connects to pumps (24, 26) and is movable by an actuator (28) for operating those pumps to pump a constant ratio output. The ratio is precisely controlled by adjustment mechanisms (140, 164). Also provided is a dispensing gun (32) that is easy to operate and includes mechanisms (202) for reducing the cure time of the mixed components.

5 Claims, 3 Drawing Sheets

DISPENSING GUN FOR RATIO SENSITIVE TWO-PART MATERIAL

This application is a continuation of application Ser. No. 07/911,973, filed on Jul. 10, 1992, now abandoned, which is a divisional of application Ser. No. 07/572,161, filed on Aug. 23, 1990, now U.S. Pat. No. 5,133,483.

TECHNICAL FIELD

This invention pertains to metering systems for controlled mixing and dispensing of two-component materials.

BACKGROUND INFORMATION

Certain modern adhesives and sealants (hereinafter, collectively referred to as sealants) are formed from two components that are mixed just prior to use. For example, a polysulfide-type sealant is formed from a mixture of a base material, such as sodium polysulfide, and a catalyst, such as an organic dichloride.

The base and catalyst must be mixed in a precise ratio so that the resultant sealant cures properly. Accordingly, the pumps that deliver the two sealant components to the mixing mechanism must be precisely controlled to deliver the correct ratio of catalyst to base.

The base and catalyst may be delivered to a dispensing gun. The gun includes a housing that contains one or more mixing chambers. The base and catalyst are combined and mixed as they flow through the mixing chambers. The mixed components (i.e., sealant) are dispensed through a nozzle that is connected to the housing. Flow of the base and catalyst through the mixing chambers is controlled by valves that are actuated by a lever or trigger mechanism that is manually operated by the gun user.

Some metering systems are designed to mix the pumped base and catalyst in a single mixing conduit that extends between the pumps and the dispensing gun. The dispensing gun may or may not have additional internal mixing chambers. Metering systems that mix the components within a long conduit are expensive to operate because the mixing conduit must be purged whenever the sealant dispensing operation is halted for a significant period of time. Purging is typically carried out by forcing only the base material through the conduit and gun. Accordingly, the large amount of the sealant and base used for purging is lost each time the dispensing operation is halted.

Systems that mix components only within the dispensing gun waste less sealant, since only the relatively small volume of the mixture within the gun must be purged each time the operation is halted. It is noteworthy, however, that the overall amount of component mixing carried out within such a system is generally less than the mixing provided by a system that mixes within both a gun and a delivery conduit. Moveover, as the amount of component mixing decreases, it becomes increasingly important to provide the precise specified ratio of catalyst to base in order to obtain satisfactory curing of the sealant. In short, a metering system that mixes components only within the dispensing gun must have reliable and accurate mechanisms for consistently providing catalyst and base in the specified ratio. Further, the metering system must include fine adjustment mechanisms for easily and quickly adjusting the ratio as necessary to account for changes in the mixing or curing characteristics of the base or catalyst.

SUMMARY OF THE INVENTION

This invention is directed to a metering system that includes mechanisms for controlling a base pump and a catalyst pump so that the pumped base and catalyst are delivered to a dispensing gun in a precisely metered, constant ratio.

The precisely metered catalyst and base are pumped to a gun that has internal mixing chambers. As an aspect of this invention, a heater is provided adjacent to the mixing chambers for heating the base and catalyst mixture to reduce the cure time of the dispensed mixture.

The flow of the base and catalyst through the internal mixing chambers of the gun is controlled by manually operated valves carried within the gun. As another aspect of this invention, the valves and the mixing chambers are arranged so that the dispensing gun will be relatively light near the dispensing end of the gun (i.e., the end of the gun from which the sealant is dispensed). As a result, the dispensing end of the gun is easily and comfortably manipulated by the user for controlling the placement of the dispensed sealant.

The metering system of the present invention particularly comprises a drive linkage that includes a first link and a second link. The first link is pivotally connected to the second link. The drive links are arranged to define a V-shape. The location of the pivot connection between the first and-second links defines the apex of the V-shaped linkage.

An actuator is provided for reciprocally moving the drive links apart and together about the apex. The position of the apex is fixed relative to the links, but the apex is movable in space as the actuator reciprocates the drive links.

A catalyst pump is connected to the drive links near the apex for pumping catalyst as the drive links are moved in response to the actuator. A base pump is connected to one of the drive links for pumping base material as the drive linkage is driven by the actuator. The base pump, catalyst pump, and drive linkage are arranged so that the output of the respective pumps remains in a precise ratio irrespective of the relative position of the drive links as the actuator reciprocates the links.

As another aspect of the invention, adjustment mechanisms are provided for precisely adjusting the position of the catalyst pump relative to the drive links, thereby to precisely adjust the ratio of the base pump and the catalyst pump output.

As another aspect of this invention, a dispensing gun is connected to the base and catalyst pumps to receive the pumped base and catalyst. The dispensing gun includes a housing having mixers incorporated therein for mixing the base and catalyst within the gun. Also provided is a heater within the gun housing for reducing the cure time of the mixed base and catalyst.

As another aspect of the invention, the dispensing gun is constructed so that the dispensing end of the gun is easily and comfortably manipulated by the user for controlling the placement of the mixture that is dispensed from the gun.

BRIEF DESCRIPTION OF THE DRAWINGS

FIG. 4 is a view taken along line 4—4 in FIG. 1 showing another link of the system drive linkage and the connection of the drive linkage to a base material pump.

FIG. 6 is a schematic diagram of a dispensing gun used with the system of the present invention.

DETAILED DESCRIPTION OF THE PREFERRED EMBODIMENT

Figure 1:
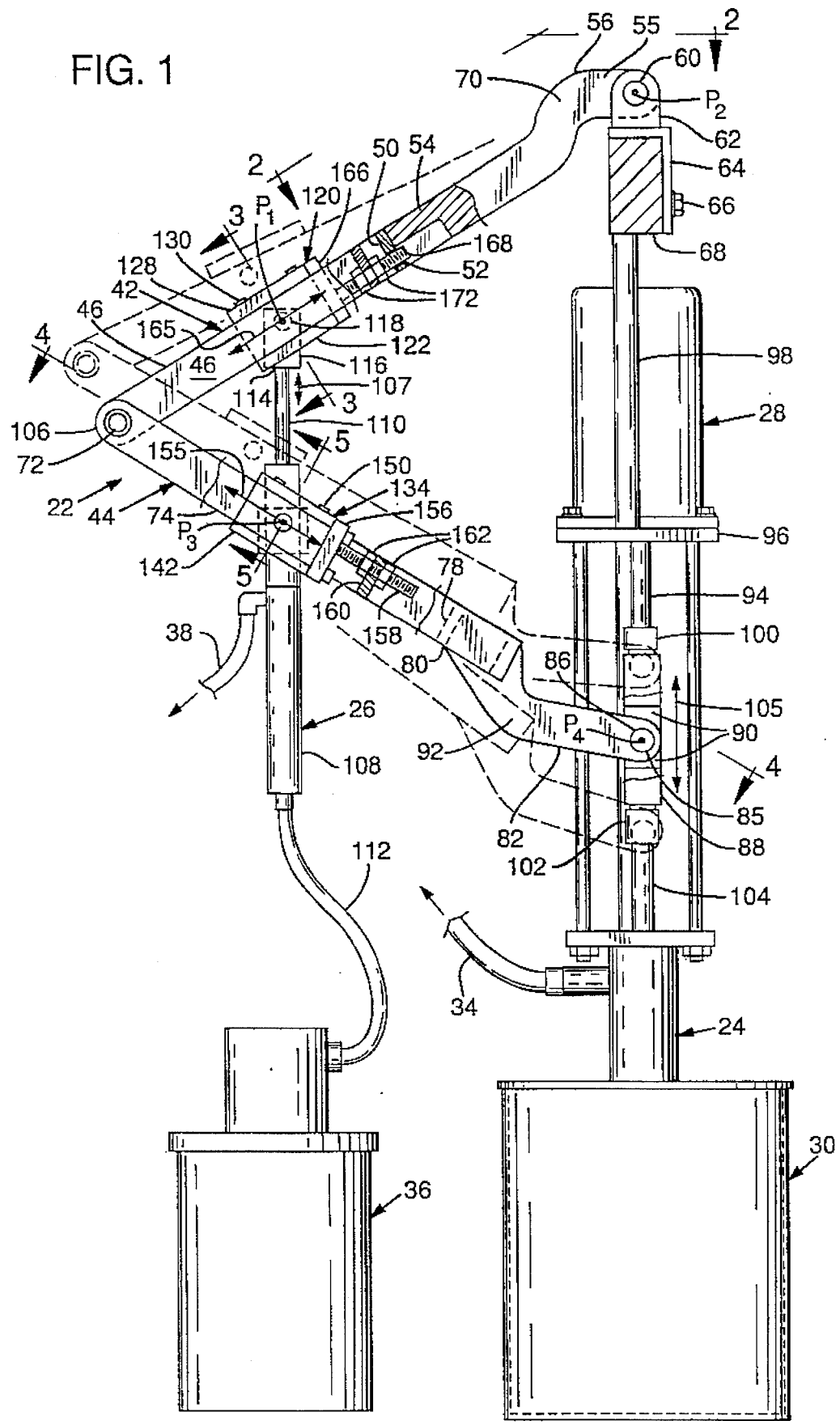
FIG. 1 is a side elevation view of the primary elements of a metering system formed in accordance with the present invention.

With reference to FIG. 1, the metering system of the present invention includes a drive linkage 22 to which a base pump 24 and catalyst pump 26 are connected. An actuator 28 moves the drive linkage 22, which movement operates the connected pumps 24, 26. The base pump 24 pumps base material from a supply 30 to a dispensing gun 32 (FIG. 6) via a base conduit 34. The catalyst pump 26 pumps catalyst material from a supply 36 to the dispensing gun 32 via a catalyst conduit 38. The base and catalyst are mixed and heated within the gun 32 and dispensed from the gun through a nozzle 40.

Turning now to the particulars of the system, and with reference to FIGS. 1–4, the drive linkage 22 includes a rigid upper drive link 42 that is pivotally connected at one end to a rigid lower drive link 44. The upper drive link 42 includes two elongated spaced-apart arms 46. A rigid web 50 is attached, as by welding, between the two arms 46 near the uppermost (i.e., to the right in FIG. 2) ends of the arms. The web 50 includes near its bottom center a clearance hole 52, the significance of which is described more fully below.

The end 54 of a rigid, flat upper connector bar 56 is welded to the center of the web 50 just above the clearance hole 52. The upper connector bar 56 extends outwardly from the web 50, centered in a plane that is between the two link arms 46. The connector bar 56 is supported by two rigid stiffeners 58 that are fastened between the uppermost ends of the arms 46 and the bar 56. Where the bar 56 joins the stiffeners 58, the depth of the bar 56 is enlarged relative to its end 54 to match the depth of the arms 46.

The outer end 55 of the connector bar 56 is pivotally connected via a pivot pin 60 to a clevis-type pivot bracket 62. The bracket 62 includes an L-shaped (FIG. 1) base 64 that may be readily attached, such as by fasteners 66, to a stationary support structure, such as the beam 68 shown in cross section in FIG. 1.

Preferably, the upper connector bar 56 includes a bend 70 near the pivot bracket 62 so that the bar 56 may pivot toward the bracket and beam 68 through a substantial angle before contacting the beam 68.

The lowermost ends of the upper drive link arms 46 are pivotally connected, via pivot pin 72 to the uppermost ends of two rigid spaced-apart arms 74 that comprise part of the lower drive link 44 (see FIG. 4).

A rigid web 78 is attached, as by welding, between the arms 74 of the lower drive link 44 near the lowermost ends of those arms 74. The end 80 of a rigid, flat lower connector bar 82 is welded to the center of the web 78. The connector bar 82 extends outwardly from the web 78, centered in a plane that is between the two link arms 74. The lower connector bar 82 is supported by two rigid stiffeners 84 that are fastened between the lowermost ends of the arms 74 and the bar 82.

The outer end 85 of connector bar 82 is pivotally connected via a pivot pin 86 to a substantially cylindrical pivot member 88 that is connected to the actuator 28, as described more fully below. The pivot member 88 includes a central slot 90 across which slot spans the pivot pin 86. The outer end 85 of the connector bar 82 fits into the slot 90.

Preferably, the lower connector bar 82 includes a bent portion 92 near the pivot member 88 so that the bar 82 may pivot toward the pivot member 88 through a substantial angle before contacting the pivot member.

As mentioned earlier, the actuator 28 moves the drive linkage 22 for operating the connected base pump 24 and catalyst pump 26. Looking first at the operation of the base pump 24, the actuator 28 may be any of a number of types, such as the illustrated pneumatically driven diaphragm-type. The actuator 28 may be controlled by conventional means for extending and retracting an actuator rod 94 (FIG. 1) in response to a pressure drop in the pump output conduits 34, 38. The pressure drop results as the sealant is dispensed from the gun 32. The actuator 28 may be mounted to a platform 96 that is suspended via bars 98 from the support beam 68. The movable actuator rod 94 is coupled by a coupling 100 to the upper end of the pivot member 88. The lower end of the pivot member 88 is coupled by a coupling 102 to the piston rod 104 of the base pump 24.

As the actuator rod 94 is reciprocated upwardly and downwardly by the actuator 28 (FIG. 1), the connected base pump piston rod 104 extends and retracts to operate the pump 24 for pumping base from the supply 30 through the base conduit 34. Preferably the pump 24 is of a type, such as manufactured by Graco, Inc., model no. 204-924, which provides continuous outflow irrespective of the direction of motion (i.e., extending or retracting) of the piston rod 104. Accordingly, whenever the actuator rod 94 is driven by the actuator 28, the base pump 24 provides a continuous flow of base through the base conduit 34.

The catalyst pump 26 is adjustably connected to the drive linkage 22 near the common pivot point or apex 106 of the drive linkage 22. More particularly, the catalyst pump 26 includes a cylinder 108 and piston rod 110 that are movable relative to one another for drawing catalyst from a supply 36 through a supply line 112 and out to the dispensing gun 32 through the catalyst conduit 38. Preferably, the catalyst pump 26 is of a type, such as manufactured by Graco, Inc., model no. 207-867, that provides continuous outflow irrespective of whether the rod 110 is extended or retracted relative to the cylinder 108.

Figure 3:
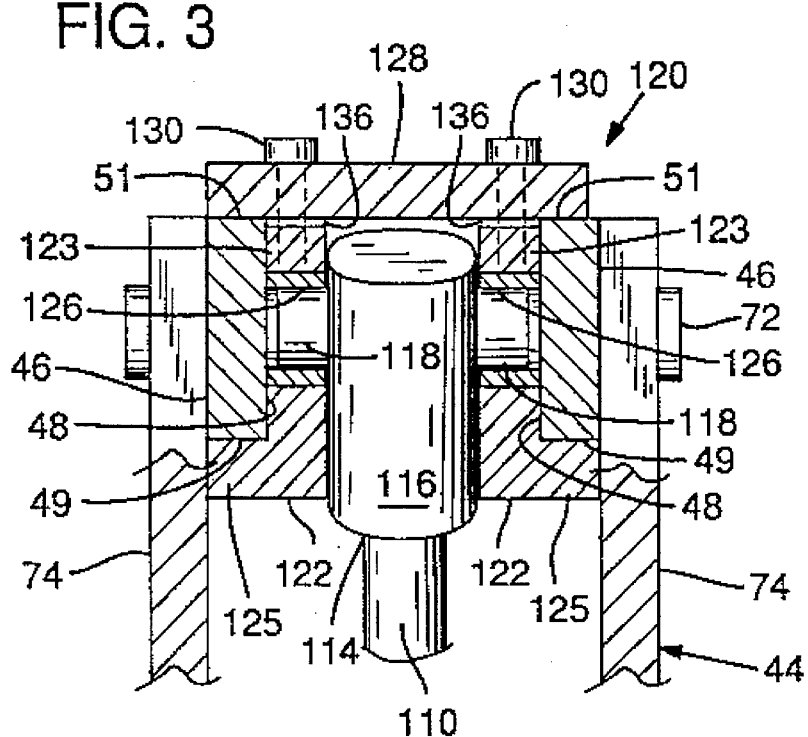
FIG. 3 is a cross-sectional view taken along line 3—3 in FIG. 1 showing one of the catalyst pump adjustment mechanisms.

As best shown in FIG. 3, the outer end 114 of the piston rod 110 is threaded into a generally cylindrical pivot block 116. The block 116 has diametrically opposed trunnions 118 that are pivotally secured within an upper mounting assembly 120 that is fastened to the upper drive link 42.

With particular reference to FIG. 3, the upper mounting assembly 120 includes two generally L-shaped slider plates 122. Each slider plate 122 includes a long leg 123 that fits against the inside surface 48 of an adjacent arm 46, and a short leg 125 that fits against the lower surface 49 of the arm 46.

Each long leg 123 of a slider plate 122 has a hole formed through it for receiving a bushing 126. Each bushing receives a trunnion 118 of the pivot block 116. Accordingly, the block 116, and attached piston rod 110, are free to pivot relative to the upper mounting assembly 120.

A cap plate 128 is attached via fasteners 130 to the long legs 123 of each slider plate 122. The cap plate 128 rests upon and extends between the upper surfaces 51 of both link arms 46. Preferably, the depth of the long legs 123 is slightly less then the depth of the arms 46 so that a gap 136 is present between the cap plate 128 and the slider plates 122. As a result, the cap plate 128 and slider plates will firmly clamp between them the arms 46 as the fasteners 130 are tightened.

Figure 5:
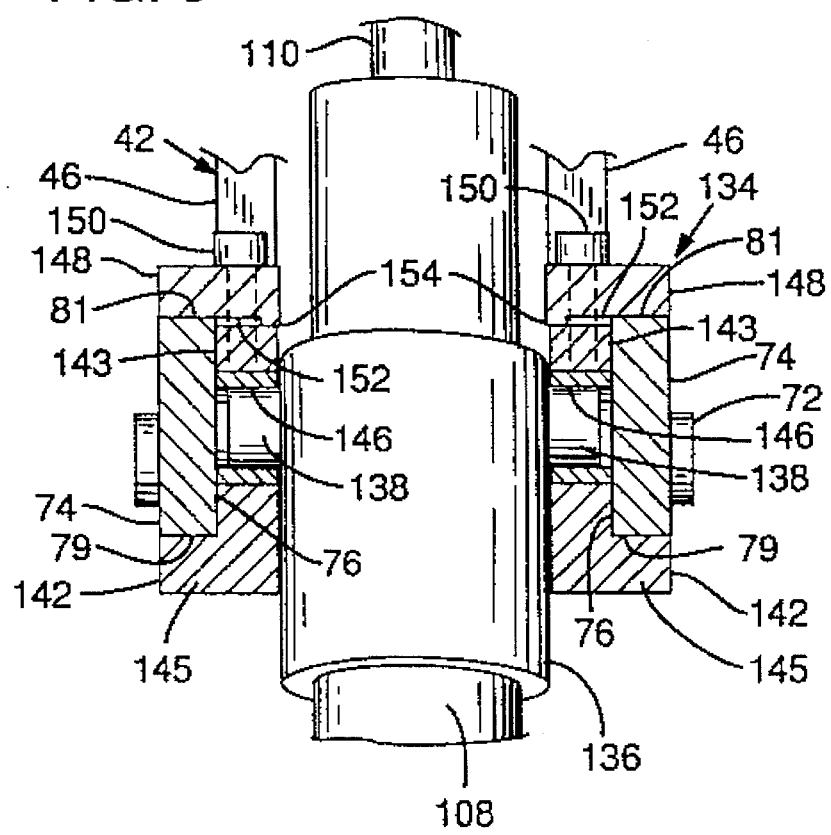
FIG. 5 is a cross sectional view taken along line 5—5 of a FIG. 1 showing another catalyst pump adjustment mechanism.

The cylinder 108 of the catalyst pump 26 is pivotally secured to a lower mounting assembly 134 that is fastened to the lower drive link 44 (FIG. 5). In this regard, the upper end of the cylinder 108 is secured within a pivot tube 136. The tube 136 has diametrically opposing trunnions 138 that are pivotally secured within the lower mounting assembly 134.

The lower mounting assembly 134 includes two generally L-shaped slider plates 142. Each slider plate 142 has a long leg 143 that fits against the inside surface 76 of an adjacent lower drive link arm 74, and a short leg 145 that fits against the lower surface 79 of the arm 74.

Each long leg 143 of a slider plate 142 includes a hole formed therethrough for receiving a bushing 146. Each bushing receives a trunnion 138 of the pivot tube 136.

As best shown in FIG. 5, the lower mounting assembly 134 includes a pair of cap plates 148. One cap plate 148 is attached via fasteners 150 to the long leg 143 of each slider plate 142. The cap plates 142 extend over and bear upon the upper surface 81 of each lower drive link arm 74. Preferably, the depth of the long legs 143 of the slide plates 142 is less than the depth of the arm 74 so that a gap 152 is present between each cap plate 148 and associated slider plate 142. Moreover, the undersurface of each cap plate 148 includes along one edge a downwardly depending ridge 154 that protrudes for a distance substantially equal to the depth of the gap 152. The ridge 154 permits the cap plate 148 to bear substantially evenly across the surface 81 of the arm 74 as the fasteners 150 are tightened to clamp the lower mounting assembly 134 to the lower drive arms 74.

The position of the upper mounting assembly 120 relative to the upper drive link 42, and the position of the lower mounting assembly relative to the lower drive link 44 may be precisely adjusted to ensure the correct ratio of catalyst to base as pumped by the pumps 24, 26.

Looking first at the lower adjustment mechanism 140 (FIGS. 1 and 4) for adjusting the position of the lower mounting assembly 134 (hence, the position of the catalyst pump cylinder 108), an adjustment plate 156 is fastened across the ends of the slider plates 142. A threaded adjustment shaft 158 is attached at one end to the adjustment plate 156. The shaft 158 extends outwardly from the plate 156 along an axis that is parallel to the direction 155 in which the lower mounting assembly 134 may be slid along the lower drive link 44.

The threaded adjustment shaft 158 extends through a clear hole in a rigid adjustment web 160 that extends between the arms 74 of the lower drive link 44. A lock nut 162 is threaded over the adjustment shaft 158 on each side of the adjustment web 160.

The cylinder 108 position relative to the drive link 44 is changed by loosening the fasteners 150 and sliding the lower mounting assembly 134 along the arms 74. When the precise position of the cylinder 108 relative to the drive link 44 is established, the lock nuts 162 are tightened against the web 160 to fix the position of the cylinder 108.

Figure 2:
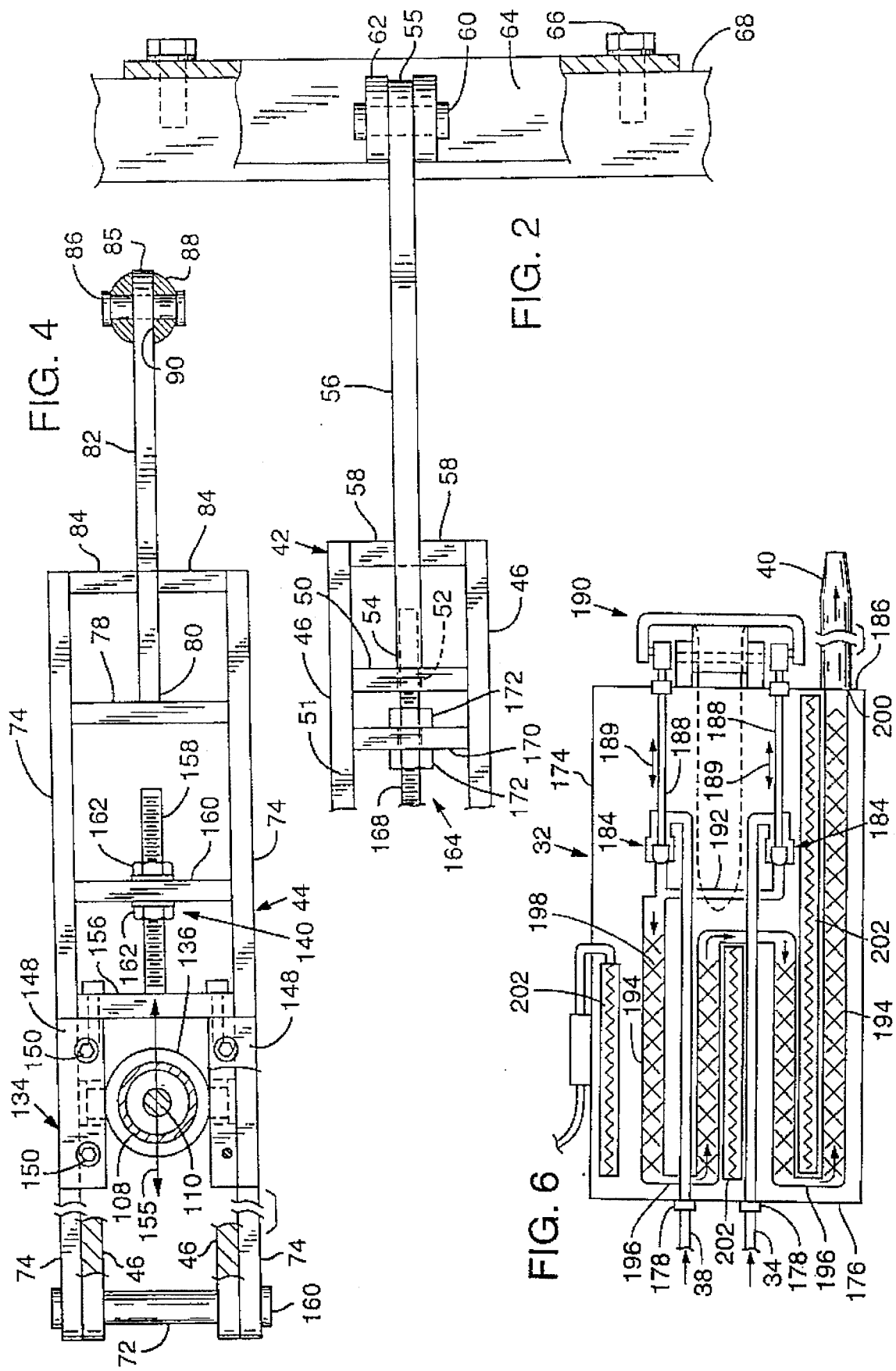
FIG. 2 is a view taken along line 2—2 of FIG. 1 showing one link of the system drive linkage and the connection of the drive linkage to a support structure.

The upper adjustment mechanism 164 for adjusting the position of the upper mounting assembly 120 (hence, the position of the catalyst pump piston rod 110) includes an adjustment plate 166 that is fastened across the ends of the slider plates 122 (FIGS. 1 and 2). A threaded adjustment shaft 168 is attached at one end to the adjustment plate 166. The shaft 168 extends outwardly from the plate 166 along an axis that is parallel to the direction 165 in which the upper mounting assembly 120 may slide along the upper drive link 42.

The threaded adjustment shaft 168 extends through a clear hole in a rigid adjustment web 170 that extends between the arms 46 of the upper drive link 42. A lock nut 172 is threaded over the adjustment shaft 168 on each side of the adjustment web 170.

The piston rod 110 position relative to the drive link 42 is changed by loosening fasteners 130 and sliding the upper mounting assembly 120 along the arms 46. When the precise position of the piston rod 110 relative to the drive link 42 is established, the lock nuts 172 are tightened against the web 170 to fix the position of the position 110.

The free end of the adjustment shaft 168 fits through the clearance hole 52 in the above-described web 50 of the upper drive link 42. Moreover, as best shown in FIG. 1, the reduced depth of the connector bar 56 also provides clearance for the free end of the adjustment shaft 168.

With particular reference to FIG. 1, it can be appreciated that the amount of base material pumped by the base pump 24 as the actuator 28 is activated to reciprocate the actuator rod 94 and connected drive linkage 22 is in direct proportion to the distance the pump piston rod 104 is moved in the travel path 105 of the rod. Further, the amount of catalyst pumped from the catalyst pump 26 as the actuator 28 drives the linkage 22 is in direct proportion to the distance the catalyst piston rod 110 and cylinder 105 are moved apart or together in the travel path shown by arrow 107.

As viewed in the elevation view of FIG. 1, the distance between the location $P_1$ where the catalyst pump rod 110 is pivotally connected to the upper drive link 42 and the location $P_2$ where the upper drive link 42 is pivotally attached to the pivot bracket 62 is preferably established to precisely match the distance between the location $P_3$ where the catalyst cylinder 108 is pivotally mounted to the lower drive link 44 and the location $P_4$ where the lower drive link 44 is pivotally attached to the pivot member 88. As a result, the path of travel 107 of the catalyst pump rod 110 and the path of travel 105 of the base pump rod 104 are straight and parallel to one another. Moreover, as a result of the technique for pivotally mounting the pumps 24, 26 to the drive linkage 22, as described above, and because of the freedom of motion of the linkage 22 (for example, the apex 106 is not restrained in space), the path of travel 107 remains straight and parallel to the path of travel 105 as the drive linkage is moved (as shown by the solid and dashed lines of FIG. 1). Consequently, the ratio of pump output between the catalyst and base pumps remains constant as the drive linkage is moved because the constantly straight and parallel relationship of the travel paths 107, 105 of the piston rods 110, 104 ensures that for any given incremental change in the position of the drive linkage 22, there will always result the same incremental travel distance (hence, the same incremental pumped output) of the connected rods 110, 104.

Stated differently, the links 42, 44 are arranged and assembled to always define with the rods 94, 110 of the base and catalyst pumps, similar isosceles triangles, with the distances between the pivot points $P_2$–$P_4$ and $P_1$–$P_3$ representing, respectively, the bases of the two triangles and the distances between pivot points $P_4$–$P_5$ and $P_3$–$P_5$ representing, respectively, one leg of each triangle, and the distances between pivot points $P_2$–$P_5$ and $P_1$–$P_5$ representing, respectively, the other leg of each triangle. Note that as the piston rods reciprocate only the lengths of the bases of the two triangles change, but those lengths change at the same rate, and, therefore, retain the same ratio of lengths. Consequently, the base and catalyst pumps will constantly pump the same ratio of base to catalyst, regardless of the direction of movement of the pump piston rods and regardless of the distances between points $P_1$-$P_3$ and $P_2$-$P_4$.

If it is desirable to change the ratio of pumped output between the base and catalyst pumps, the adjustment mechanisms 140, 164 described above may be manipulated for moving the mounting assemblies 120, 134 (hence, moving the catalyst pump 26) along their respective drive links 42, 44 in a manner as described above. For instance, movement of the mounting assemblies 120, 134 away from the apex 106 will increase the ratio of catalyst to base output. In order to ensure a constant ratio, as described above, it is important that adjustments made to the position of one mounting assembly 120 precisely match those made to the other mounting assembly 134, so that the distance between point $P_1$ and $P_2$ always matches the distance between point $P_3$ and $P_4$. Preferably, the drive links 42, 44 are provided with indicia to aid the operator in precisely locating the mounting assemblies 120, 134.

As noted above, the catalyst and base are pumped via conduits 34 and 38 to the dispensing gun 32. The gun 32, shown schematically in FIG. 6, includes a housing 174 which may be formed, for example, of a rigid material, such as an aluminum alloy. The rearward end 176 of the housing includes fittings 178 for coupling the base conduit 34 and catalyst conduit 38 to internal conduits 180, 182 that are located within the housing 174. The internal conduits 180, 182 direct the catalyst and base to valves 184 that are located near the forward end 186 of the housing 174.

The valves 184 are opened or closed as the attached valves stems 188 are cranked outwardly or inwardly (see arrow 189) by a handle 190 that is operated by the gun user.

When the valves 184 are opened, the base and conduit flow together via conduit branch 192 into a series of adjacent elongated chambers 194 that are formed in the housing 174. The chambers 194 are connected at their ends by connecting conduits 196 so that there is defined by the mixing chambers 194 and connecting conduits 196 a serpentine path through which the combined base and catalyst travel.

Conventional mixing devices, such as a rigid plastic baffle illustrated at 198, are carried within the mixing chambers 194 for the purpose of mixing the base and catalyst. The base and catalyst mixture is dispensed through nozzle 40 that is connected to a port 200 in the forward end 186 of the housing 174.

With the valves 184 located near the forward end 186 of the housing, most of the combined length of the mixing chambers 194 is located near the rearward end 176 of the housing. As a result, the portion of the overall gun weight that is attributable to the presence of catalyst and base within the mixing chambers 194 is carried in the rearward end 176 of the gun 32. Consequently, the forward end 186 of the housing 174 is relatively light so that the nozzle 40 may be easily manually manipulated for precisely directing the material out of the nozzle 40 to the desired location.

Preferably, a heating element 202, such as an electrical resister, is incorporated within the housing near the mixing chambers 194. The heating element 202 warms the mixed base and catalyst to advantageously reduce the cure time of the mixed components. Although only a single resistive type heater 202 is depicted in FIG. 6, it is contemplated that several such heaters may be enclosed within the housing adjacent to the mixing chambers 194.

While the present invention has been described in accordance with a preferred embodiment, it is to be understood that certain substitutions and alterations may be made thereto without departing from the scope of the appended claims.

I claim:

1. A dispensing gun for mixing and dispensing two fluid components comprising;

conduits for delivering to the gun two fluid component;

a housing having a forward end and a rearward end, the rearward end connected to the conduits;

mixer means for mixing the two components within an elongated mixing chamber inside the housing, through which chamber the two components mix together and move through the housing;

a dispensing port formed in the forward end of the housing for dispensing through the port the two mixed components;

wherein the mixing chamber comprises a connected series of mixing chamber sections, a majority of the length of the mixing chamber being located near the rearward end of the housing;

an elongated heater mounted within the housing and located to extend alongside the mixing chamber for heating the mixed components; and valves mounted in the housing for controlling flow of the two components through the housing, the valves being located forward of the majority of the length of the mixing chamber sections of the gun.

2. The gun of claim 1 wherein the heater is mounted so that the substantial length of the heater extends alongside the mixing chamber.

3. A dispensing gun for mixing and dispensing two fluid components, comprising:

a housing having a forward end and a rearward end and an internal elongated path, through which path fluid material may be forced, the internal elongated path containing mixer elements extending therethrough for mixing the two fluid components within the path;

a nozzle attached to the forward end of the housing at an end of the path, through which nozzle fluid components pass from the path to be dispensed from the gun; and the path being arranged so that most of the length of the path that contains mixer elements is located nearer to the rearward end than to the forward end of the housing.

4. The gun of claim 3 further comprising a heater incorporated in the housing for heating fluid that flows through the path.

5. The gun of claim 3 further comprising valve means for controlling the movement of fluid through the path, the valve means including valves located nearer to the forward end than to the rearward end of the housing.

\* \* \* \* \*